Nov. 24, 1925.
G. D. MORRISSEY
GLARESHIELD
Filed July 12, 1924
1,562,909
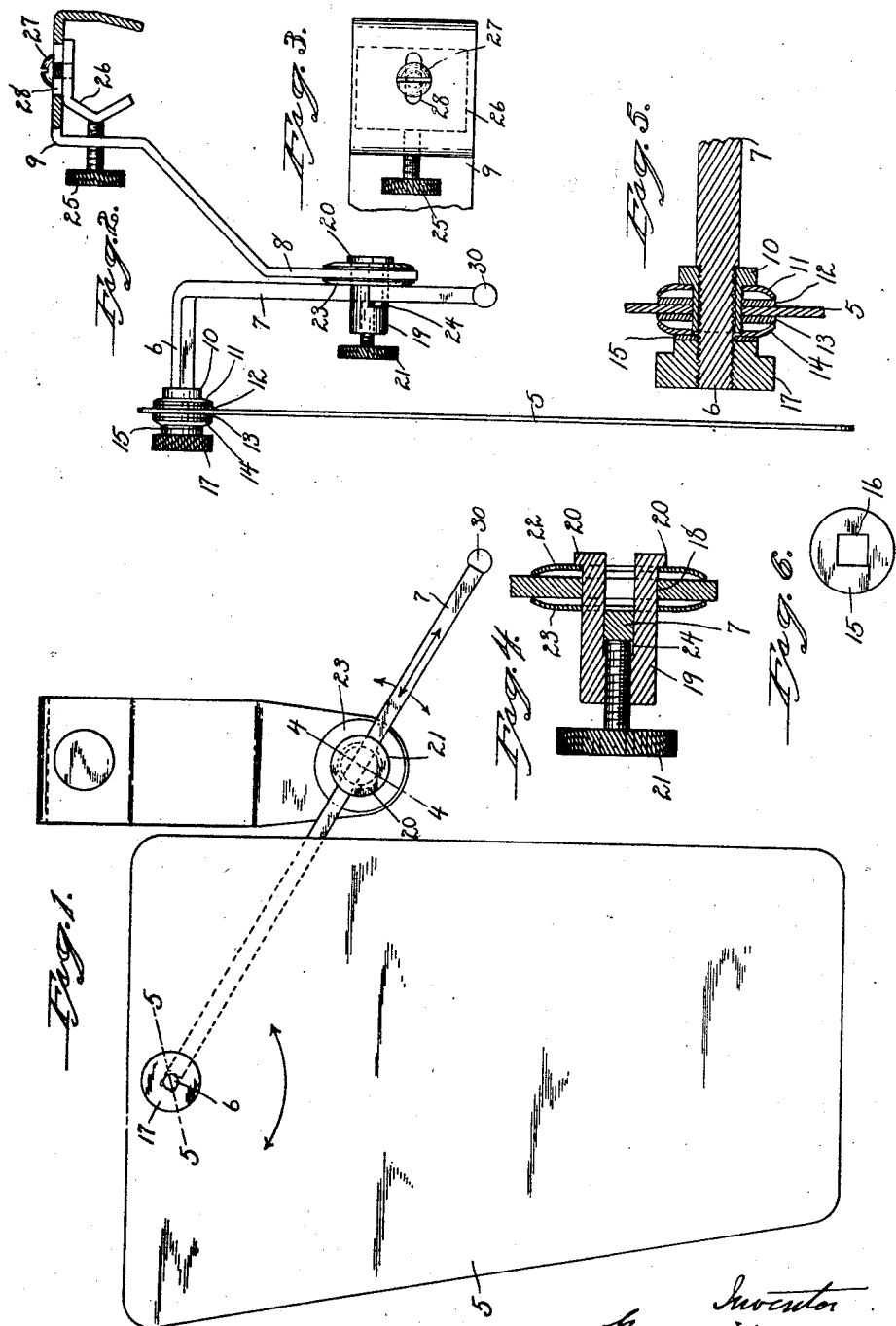

Patented Nov. 24, 1925.

1,562,909

UNITED STATES PATENT OFFICE.

GREGORY D. MORRISSEY, OF WEST HAVEN, CONNECTICUT.

GLARESHIELD.

Application filed July 12, 1924. Serial No. 725,562.

*To all whom it may concern:*

Be it known that I, GREGORY D. MORRISSEY, a citizen of the United States, residing at West Haven, in the county of New Haven and State of Connecticut, have invented a new and useful Improvement in Glareshields; and I do hereby declare the following, when taken in connection with the accompanying drawings and the characters of reference marked thereon, to be a full, clear, and exact description of the same, and which said drawings constitute part of this application, and represent, in—

Fig. 1 a face view of a glare shield constructed in accordance with my invention.

Fig. 2 a side view, partly in section, of the same.

Fig. 3 a broken end view of the clamp.

Fig. 4 a sectional view on the line 4—4 of Fig. 1.

Fig. 5 a sectional view on the line 5—5 of Fig. 1.

Fig. 6 a plan view of a nut-washer, detached.

This invention relates to improvement in glare shields and particularly to glare shields for the windshields for automobiles, and particularly to that type of glare shields which consists of a sheet of semi-transparent material adapted to be turned into the line of vision of the driver of the car. The object of the invention is to produce a glare shield which may be readily turned to any desired position of adjustment and held in such position by friction, so the position can be changed without adjusting the tension on the parts, and the invention consists in the construction as hereinafter described and particularly recited in the claims.

In carrying out my invention, I employ a sheet 5 of semi-transparent material, such as commonly used in glare shields and of the desired form. This is mounted on the outer end 6 of a sliding-bar 7, which is mounted on the end 8 of a clamp 9, which is adapted to be secured to the frame of a windshield, or on one of the uprights. The sliding-bar 7 is preferably rectangular in cross-section, and to connect the shield 5, it is preferably formed as indicated in Fig. 5 of the drawings. The outer portion of the end 6 is externally threaded and a flanged collar 10 turned onto it to a bearing. A spring-washer 11 is then set over the collar, to rest against the flange, then a flat washer 12 against the spring-washer 11, then the shield 5, and on the opposite side of the shield 5 is a flat washer 13, then a spring-washer 14, then a flat washer 15 with an angular hole 16 corresponding to the end 6 of the bar, and then a thumb-nut 17 is applied to the end 6 and turned on so as to produce the necessary friction upon the shield 5. The washers 12 and 13, being flat and on opposite sides of the shield, protect that shield against wear and form surfaces for the spring-washers 11 and 14, while the flat washer 15 prevents the nut 17 from being turned by the movement of the shield. Preferably, the bar 7 is attached to the clamp 9 by forming the clamp with a hole 18 for the entrance of a transversely-slotted post 19 formed at one end with a flange 20 and mounting a set-screw 21 in its outer end. Over the post and bearing upon the flange 20 is a spring-washer 22, then the clamp 9 is passed over the post and a spring-washer 23 arranged on the outer side. The bar 7 then passes through a slot 24 and is engaged by the inner end of the screw 21, so that the bar, while frictionally held against longitudinal movement with sufficient force to prevent accidental displacement, can be moved back and forth by the operator, and, due to the spring-washers 22 and 23, can be rotated. The clamp 9 may be clamped to the windshield or other support by a set-screw 25, and to adapt the device for certain styles of windshield frames, I may provide a shoe 26 which is adjustably secured to the clamp 9 by a screw 27 extending through a slot 28 in the clamp. To prevent the withdrawal of the sliding-bar, a nut 30 may be applied to its inner end.

This glare shield is readily adjusted to a car at any desired point and the bar 7 adjusted longitudinally on the clamp and the glare shield mounted as above described to the end of the sliding-bar. When thus adjusted, the sliding-bar may be turned on the clamp without changing the position of the screw 21, and the shield 5 may be adjusted on the outer end 6 of the sliding-bar 7 without changing the position of the clamping-nut 17.

I thus provide a glare shield which may be turned into almost any desired position through the frictional engagement of the parts and without requiring the adjustment of screws, which usually requires two hands. My shield can, therefore, be adjusted by the driver without danger,

I claim:

A glare shield, comprising an angular sliding-bar threaded at one end, a flanged collar turned into said threaded end, a shield mounted on said collar, a spring-washer on each side of said shield, a nut applied to the end of the bar for producing friction upon the shield, a slotted post through which said sliding-bar extends, means for frictionally engaging the sliding-bar with the said post, a clamp with which said post is frictionally connected, and means for adjustably mounting the clamp.

In testimony whereof, I have signed this specification.

G. D. MORRISSEY.